No. 817,547. PATENTED APR. 10, 1906.
A. C. BUTLER.
TACHOMETER.
APPLICATION FILED JUNE 24, 1905.
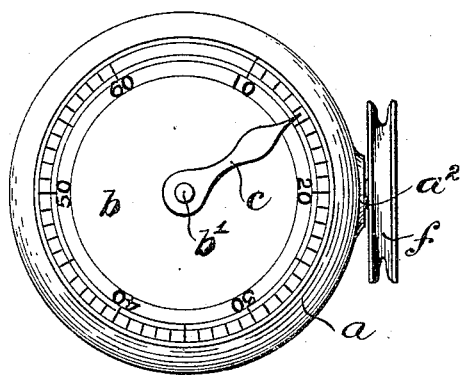
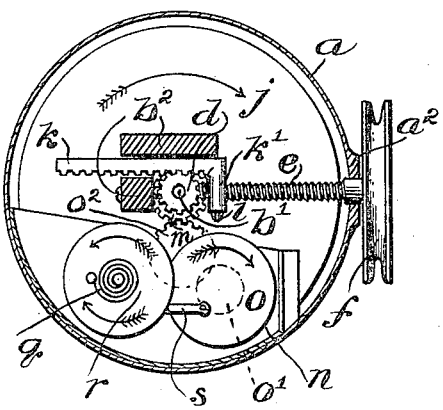
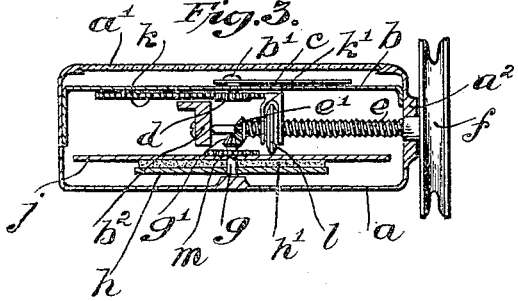
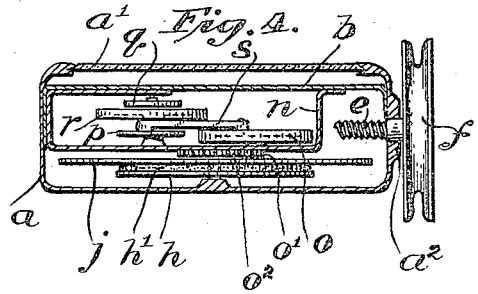
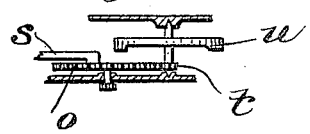
Attest:
Inventor:
Arthur Cecil Butler,
by N. L. Frothingham,
his Atty.

UNITED STATES PATENT OFFICE.

ARTHUR CECIL BUTLER, OF WOLLASTON, MASSACHUSETTS.

TACHOMETER.

No. 817,547. Specification of Letters Patent. Patented April 10, 1906.

Application filed June 24, 1905. Serial No. 266,720.

*To all whom it may concern:*

Be it known that I, ARTHUR CECIL BUTLER, a subject of the King of the United Kingdom of Great Britain and Ireland, and a resident of Wollaston, in the county of Norfolk and State of Massachusetts, have invented certain new and useful Improvements in Tachometers, of which the following is a specification, reference being had therein to the accompanying drawings, which form a part thereof.

My invention relates to tachometers, and more particularly to a type thereof adapted for use on road-vehicles.

The main object of the invention is to provide an indicator of this character wherein the registering means will be actuated from a disk driven after reaching its maximum speed at a constant velocity and as a result of the difference in velocity between the mechanism driving said disk and said disk itself.

A further object is to provide an indicator of this character wherein the speed of rotation of the disk actuating the registering means will be made uniform by a mechanism acting positively upon said disk and not be dependent upon a braking action through friction or centrifugal force.

A still further object is to provide an indicator of this character wherein the various constituent elements will be subject to but slight wear and will not be disarranged or caused to operate inaccurately through the jolting or vibrations incidental to a vehicle moving over ordinary roads.

A still further object is to provide an indicator of this character wherein the means controlling the actuating-disk for the registering means will be simple and compact and not be subject to such variations as will tend to materially affect the accuracy of the instrument; and a still further object is to provide an indicator of this character which will be compact and neat in appearance and which will be simple in its construction and not expensive to manufacture.

The invention consists, primarily, in the combination, in an indicator of the character described, of speed-registering means, a rotary screw, a traveler-wheel thereon, means actuated by said traveler-wheel whereby said registering means is actuated, a rotary disk engaging the periphery of said traveler-wheel, means actuated by said screw whereby said disk is frictionally driven, means whereby said disk is prevented from exceeding a predetermined speed, and means whereby said screw may be driven, and in such other novel features of construction and combination of parts, as are hereinafter set forth and described, and more particularly pointed out in the claims hereto appended.

Referring to the drawings, Figure 1 is a view of the indicator-dial face and hand and the main driving-pulley. Fig. 2 is a view of the indicator with the dial removed and also a portion of the inner casing supporting the disk-controlling mechanism removed to disclose said mechanism. Fig. 3 is a section showing the worm, the disk, and its actuating mechanism only. Fig. 4 is a similar view with said worm and said disk-actuating mechanism broken away to disclose a full view of the disk-controlling mechanism, and Fig. 5 is a modification of the said disk-controlling mechanism.

Like letters refer to like parts throughout the several views.

In the embodiment of my invention shown in the drawings, $a$ denotes the indicator-casing, having a crystal or protecting glass cover $a'$ for the top thereof and a bearing $a^2$ in one side thereof. Secured to the casing $a$ beneath the crystal $a'$ is a dial-plate $b$, the graduations of which indicate about six times the minimum velocity at which the instrument will register the velocity of travel. Mounted in said plate is a rotatable pivot $b'$, the opposite ends of which respectively carry a dial-finger or hand $c$ and a small pinion $d$. The dial-plate $b$ also carries a block $b^2$, having a way therein above the pinion $d$.

Mounted in the bearings $a^2$ and in the block $b^2$ is a rotary screw or worm $e$, which may be driven from a vehicle-axle or other shaft in any desired manner, preferably by means of a pulley $f$ and a cord running over a similar pulley or sheave on said axle or shaft.

Centrally of the bottom of the casing $a$ is a stud-bearing, upon which is mounted the tubular shaft $g$, carrying a small bevel-gear $g'$ on its upper end, and a friction device comprising a plate $h$ and a friction-pad $h'$ thereon. The plate $h$ is rotated at varying velocity corresponding with the changes in speed of the vehicle axle or shaft by means of the bevel-gear $e'$, carried by the worm $e$ and in mesh with the gear $g'$. Thus the plate $h$ is positively driven at a velocity corresponding at all times to that of the said worm $e$. Loosely mounted on the shaft $g$ and in frictional engagement with the pad $h'$ is a rotary disk $j$, which is driven through said pad, means being provided, however, whereby the velocity of its rotation will be limited to the minimum speed at which the indicator registers the speed, such means overcoming in part the frictional engagement of the said disk $j$ and the pad $h'$ and causing such slippage as will permit the said disk to be run thereby at a uniform speed at all times when the velocity of the worm $e$ is in excess of that required to cause the indicator to register the speed of the vehicle.

Movable in the way in the block $b^2$ and meshing with the pinion $d$ is a rack $k$, having a doubly-forked arm $k'$, the forks respectively straddling the screw $e$, and a traveler-wheel $l$, mounted on said screw. Movement of said traveler $l$ imparts similar movement to said rack $k$ and through the pinion $d$ to the dial hand or finger $c$ to indicate the speed of the vehicle. The traveler-wheel $l$ preferably has a reduced periphery and is in frictional engagement with the disk $j$, and movement is imparted to said traveler through the variance in the velocity of the screw $g$ and said disk, the friction between the said traveler and the said disk serving to impede the rotation of the former and cause it to work along said screw.

The disk $j$ has secured thereto a small gear $m$, through which the rotation of the said disk is maintained at a uniform speed by the controlling mechanism. This mechanism is carried in a casing $n$ and is actuated by a weighted driving-wheel $o$, carrying a gear $o'$, driven by an idler $o^2$, in mesh therewith and with the gear $m$. Mounted on a counter-shaft in the casing $n$ is a hollow shaft carrying a disk $p$ and having secured thereto one end of the coiled spring $q$. Loosely mounted on the same hollow shaft and having the other end of the spring $q$ secured thereto is a weighted balance-wheel $r$. A crank $s$ connects the driving-wheel $o$ and the disk $p$, the relative radii of the points of connection of the opposite ends of the said crank being such as to impart an oscillatory movement to said disk $p$.

In the modification shown in Fig. 5 I have shown the driving-wheel $o$ as having a toothed or geared edge in mesh with a smaller gear $t$, driving a small fly-wheel $u$, the purpose of which construction is to prevent any irregularity in the rotation of the disk $j$, owing to the crank connection between the wheel $o$ and disk $p$.

The mode of operation of the herein-described tachometer or speed-indicator is substantially as follows: The wheel $f$ being suitably belted to the axle of a vehicle or other shaft, it is caused to turn therewith, thus rotating the screw $e$ and through the gears $e'$ $g'$ and the shaft $g$ the plate $h$, with its friction pad or face $h'$, by a direct positively-applied force and at a speed variable with and corresponding to that of said axle or shaft. The disk $j$ is rotated through the frictional engagement of the pad $h'$ therewith and itself rotates the traveler-wheel $l$ or permits it to rotate under the influence of the said screw $e$. The traveler-wheel $l$ when the velocity of rotation is less than that at which the indicator registers the speed is distant from the axis of the disk $j$ to an extent equaling its own radius, so that all parts up to the speed of minimum registration are turning at equal speed and all in the same direction, thus avoiding wear. As the disk $j$ turns, however, it rotates the fly-wheel $o$ through the gears $m$, $o^2$, and $o'$. This imparts through the crank $s$ an oscillatory movement of the disk $p$ and its shaft and through the spring $q$ to the balance-wheel $r$ in a manner similar to that of the balance-wheel of a clock. So long as the velocity of the disk $j$ is below that of the minimum speed at which the instrument registers all the moving parts run smoothly, the oscillations of the wheel $r$ being regular and not affecting the speed of the said disk $j$. When the speed increases, however, the velocity of the screw $e$, the driving-plate $h$, and its friction-pad $h'$ increases, and there is a tendency to increase that of the disk $j$ and the controlling mechanism thereof. This tendency, however, merely causes the balance-wheel $r$ to oscillate to a greater extent, resulting in a reaction through the spring $q$ upon the controlling mechanism sufficient to overcome in part the frictional engagement of the disk $j$ and the pad $h'$ and cause such slippage between said parts as to prevent any acceleration in the movement of said disk, thus causing said disk to run at a uniform speed at all times after the speed of the other parts exceeds that at which the dial-hand $c$ is first actuated. This causes a variance in the velocity of the screw $e$ and the disk $j$, and as the traveler-wheel $l$ is in frictional engagement with both said parts and the disk $j$ acts at the greater leverage said wheel is retarded in its rotation relative to the said screw, which variance causes it to work along said screw until its periphery reaches a point on a given radius of said disk where a single revolution of said disk will impart or permit a velocity of said wheel corresponding to that of the said screw. Under such conditions it will be observed that all parts are again rotating without friction and uniformly, except the disk $j$ relative to the pad $h'$. The above-described movement of the traveler-wheel reciprocates the rack $k$, thus actuating the hand $c$ and registering the increase in the velocity of the various parts and the vehicle itself. It is apparent that a reduction in the velocity of movement of the parts will operate in a similar manner to bring the velocity of the wheel $l$ to that of the screw $e$ and its peripheral travel equal to the circumference of the path in which it travels on the disk $j$ at each revolution of said disk and cause the hand $c$ to register the decrease of speed on the dial $b$.

The speed at which the various parts move is never very high, and as the greater part of the time these parts are moving at a relatively uniform velocity there is little or no wear, except possibly between the disk $j$ and the pad $h'$. If it be found that the crank $s$ prevents an even and uniform movement of said disk $j$ at all times, the fly-wheel $u$ and pinion $t$ may be employed to steady the wheel $o$, as described.

The herein-described instrument presents only positively-actuated parts of simple and inexpensive design, the accuracy of the instrument not being dependent upon a centrifugal friction-brake, the balance-wheel serving to more accurately control the velocity of the disk. It is susceptible to slight and quick variances in speed of the vehicle and will register such accurately.

It is not my intention to limit the invention to the precise details of construction shown in the accompanying drawings, as it is apparent that such may be varied in details without departing from the spirit and scope of the invention.

Having described the invention, what I claim as new, and desire to have protected by Letters Patent, is—

1. In an indicator of the character described, the combination of speed-registering means, a rotary screw, a traveler-wheel thereon, means actuated by said traveler-wheel whereby said registering means is actuated, a rotary disk engaging the periphery of said traveler-wheel, means actuated by said screw whereby said disk is frictionally driven, means whereby said disk is prevented from exceeding a predetermined speed, and means whereby said screw may be driven.

2. In an indicator of the character described, the combination of speed-registering means, a rotary screw, a traveler-wheel thereon, means actuated by said traveler-wheel whereby said registering means is actuated, a rotary disk engaging the periphery of said traveler-wheel, a driving-plate, a friction-pad thereon engaging said disk, means actuated by said screw driving said plate at variable speed, means whereby said disk is prevented from exceeding a predetermined speed, and means whereby said screw may be driven.

3. In an indicator of the character described, the combination of speed-registering means, a rotary screw, a traveler-wheel thereon, means actuated by said traveler-wheel whereby said registering means is actuated, a rotary disk engaging the periphery of said traveler-wheel, a rotary shaft carrying a driving-plate and a friction-pad engaging said disk, intermeshing gears carried by said shaft and said screw respectively, means whereby said disk is prevented from exceeding a predetermined speed, and means whereby said screw may be driven.

4. In an indicator of the character described, the combination of a case, a dial-plate, a rotary pivot therein carrying an indicator finger or hand and a pinion, a rotary screw, a traveler-wheel thereon, a rack having a forked arm straddling said traveler-wheel, in mesh with said pinion, a rotary disk engaging the periphery of said traveler-wheel, a rotary shaft carrying a driving-plate and a friction-pad engaging said disk, intermeshing gears carried by said shaft and said screw respectively, means whereby said disk is prevented from exceeding a predetermined speed, and means whereby said screw may be driven.

5. In an indicator of the character described, the combination of speed-registering means, a rotary member driven at variable speed, a frictionally-driven rotary member, means controlling the velocity of said frictionally-driven member comprising a driving-wheel, an oscillatory member, a balance-wheel, a coiled spring, the opposite ends of which are connected to said oscillatory member and said balance-wheel respectively, means whereby said driving-wheel is rotated by said frictionally-driven member, connections between said driving-wheel and said oscillatory member, and means actuated by the variance in the velocity of said variable-speed member and said frictionally-driven member whereby said speed-registering means is actuated.

6. In an indicator of the character described, the combination of speed-registering means, a rotary screw, a traveler-wheel mounted thereon, means actuated by said traveler-wheel whereby said registering means is actuated, a rotary disk engaging the periphery of said traveler-wheel, means whereby said disk is frictionally driven, means whereby said disk is prevented from exceeding a predetermined speed comprising a driving-wheel, an oscillatory member, a balance-wheel, a coiled spring the opposite ends of which are connected to said oscillatory member and said balance-wheel respectively, connections between said driving-wheel and said disk, and between said driving-wheel and said oscillatory member, and means whereby said screw may be driven.

7. In an indicator of the character described, the combination of speed-registering means, a rotary screw, a traveler-wheel mounted thereon, means actuated by said traveler-wheel whereby said registering means is actuated, a rotary disk engaging the periphery of said traveler-wheel, means whereby said disk is frictionally driven, a gear carried by said disk, means whereby said disk is prevented from exceeding a predetermined speed comprising a driving-wheel, an oscillatory member, a balance-wheel, a coiled spring, the opposite ends of which are connected to said oscillatory member and said balance-wheel respectively, a gear carried by said driving-wheel, and an idler meshing with the gear on said driving-wheel and on said disk, a crank connecting said driving-wheel and said oscillatory member, and means whereby said screw may be driven.

8. In an indicator of the character described, the combination of a case, a dial-plate, a rotary pivot therein carrying an indicator finger or hand and a pinion, a rotary screw, a traveler-wheel thereon, a rack having a forked arm straddling said traveler-wheel, in mesh with said pinion, a rotary disk engaging the periphery of said traveler-wheel, a rotary shaft carrying a driving-plate and a friction-pad engaging said disk, intermeshing gears carried by said shaft and said screw respectively, means whereby said disk is prevented from exceeding a predetermined speed comprising a driving-wheel, an oscillatory member, a balance-wheel, a coiled spring, the opposite ends of which are connected to said oscillatory member and said balance-wheel respectively, connections between said driving-wheel and said disk, and between said driving-wheel and said oscillatory member, and means whereby said screw may be driven.

In witness whereof I have hereunto affixed my signature, this 20th day of June, 1905, in the presence of two witnesses.

ARTHUR CECIL BUTLER.

Witnesses:
 N. L. FROTHINGHAM,
 A. A. ASHMAN.